United States Patent
Pankajakshan et al.

(10) Patent No.: US 8,325,605 B1
(45) Date of Patent: Dec. 4, 2012

(54) MANAGING MEDIA RESOURCES UTILIZING SESSION INITIATION PROTOCOL

(75) Inventors: Bejoy Pankajakshan, Olathe, KS (US); Shingara Singh Dhanoa, Overland Park, KS (US); Randolph Keith Hiser, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1027 days.

(21) Appl. No.: 12/330,808

(22) Filed: Dec. 9, 2008

(51) Int. Cl.
*G01R 31/08* (2006.01)

(52) U.S. Cl. .......................... 370/231; 370/352; 709/224

(58) Field of Classification Search .................. 370/229, 370/231, 328, 352; 709/224
See application file for complete search history.

(56) References Cited

U.S. PATENT DOCUMENTS

| | | | |
|---|---|---|---|
| 2005/0207360 A1* | 9/2005 | Costo et al. | 370/282 |
| 2007/0297339 A1* | 12/2007 | Taylor et al. | 370/248 |
| 2010/0128715 A1* | 5/2010 | Dei et al. | 370/352 |

* cited by examiner

*Primary Examiner* — Jung Park

(57) ABSTRACT

Embodiments of the present invention relate to systems, methods and computer storage media for managing the communication of media communicated to a Session Initiation Protocol (SIP) enabled multiplexer in a media distribution network. A SIP enabled multiplexer receives information from one or more components of the media distribution network to identify the status of the media distribution networks. Utilizing the information, a level of communication that media is to be communicated from a media source is determined. The level of communication is maintained until a request is received to communicate media from the media source. The request is compared to the determined level of communication at which the media is to be communicated. The media source receives an indication as to the level of communication that media is to be communicated. As a result, the media source communicates a request to communicate media at the indicated level of communication.

20 Claims, 6 Drawing Sheets

MANAGING MEDIA RESOURCES UTILIZING SESSION INITIATION PROTOCOL

BACKGROUND

Media streams are typically aggregated into a transport stream for communicating the media across cable television networks, satellite networks, and Internet provider networks. The aggregation of multiple media streams into a transport stream is generally performed by a multiplexer. Typically, media is communicated through an upstream network before being multiplexed into a transport stream or encapsulated for delivery in a TCP/IP environment. The transport stream is then communicated through a downstream network for distribution to one or more end users. Unfortunately, available resources in networks upstream and downstream of a multiplexer vary depending on conditions and demands. Therefore, resources upstream of a multiplexer are ineffectively utilized when media is communicated at a quality, compression, or standard that exceed the resources available in a downstream network.

Available resources, user preferences, and device capabilities typically result in contention when communicating media from a media source to be multiplexed and eventually communicated to an end device. For instance, a media source, such as a mobile communications device, may request to communicate media, such as a captured video, at a high quality level. But, unknown to the media source, sufficient resources are not available further down stream in the communication flow of the media to support the requested level of quality. Therefore, the media source utilizes greater resources than necessary to begin the communication of the media at a higher quality level than is supported at a later point in the communication of the media.

SUMMARY

Embodiments of the present invention relate to systems, methods, and computer storage media for managing the communication of media communicated to a Session Initiation Protocol (SIP) enabled multiplexer in a media distribution network. Embodiments of the present invention include negotiating resources across one or more networks to effectively communicate media. The methods include receiving information from a SIP enabled multiplexer indicating a level of communication at which media is to be communicated from a media source. The methods also include receiving a request from the media source to communicate media from the media source at a level different than the level indicated by the SIP enabled multiplexer. The methods additionally include communicating to the media source an indication that media is to be communicated at a level commensurate with the level indicated by the SIP enabled multiplexer. The methods also include receiving a second request from the media source to communicate media at the indicated level of communication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
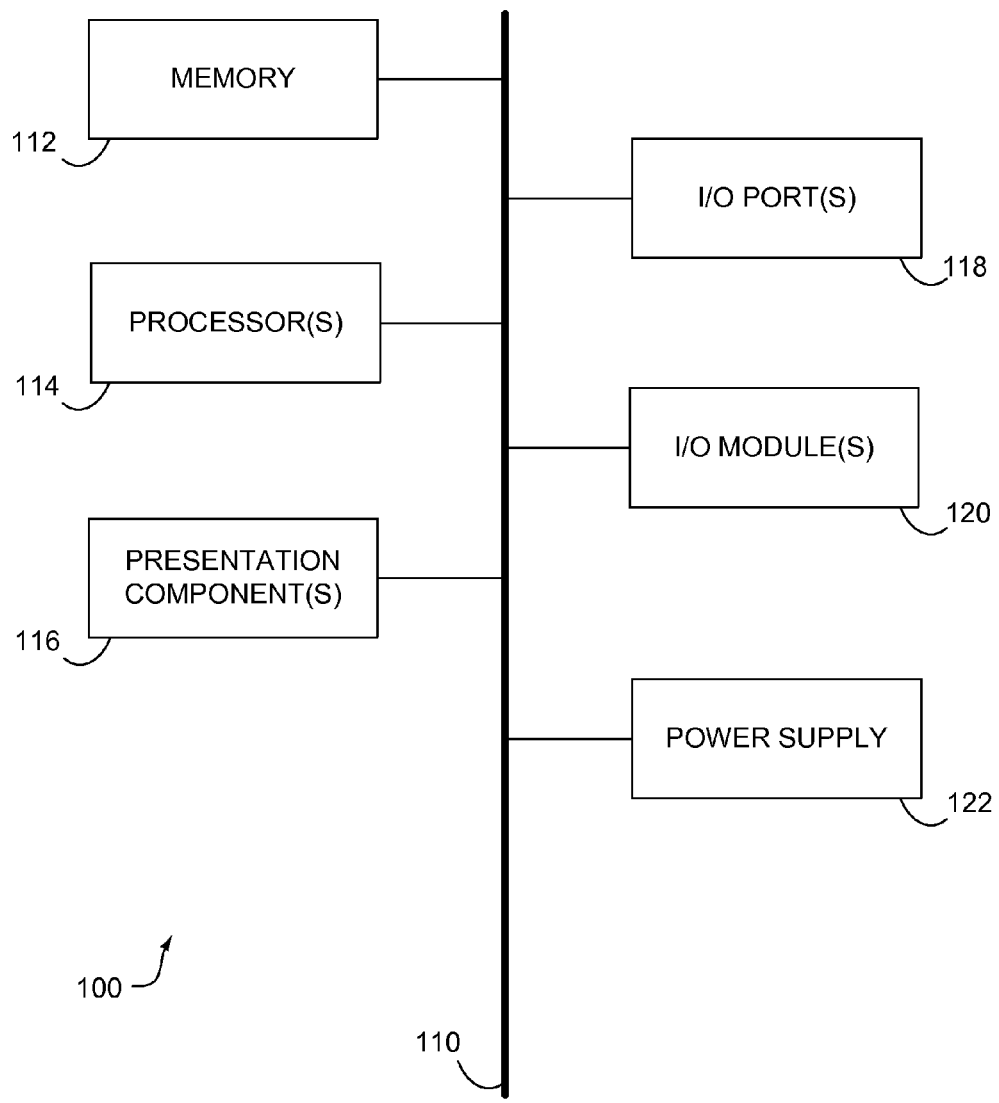
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for managing the communication of media communicated to a Session Initiation Protocol (SIP) enabled multiplexer in a media distribution network. Embodiments of the present invention include negotiating resources across one or more networks to effectively communicate media. The methods include receiving information from a SIP enabled multiplexer indicating a level of communication at which media is to be communicated from a media source. The methods also include receiving a request from the media source to communicate media from the media source at a level different than the level indicated by the SIP enabled multiplexer. The methods additionally include communicating, to the media source, an indication that media is to be communicated at a level commensurate with the level indicated by the SIP enabled multiplexer. The methods also include receiving a second request from the media source to communicate media at the indicated level of communication.

Accordingly, in one aspect, the present invention provides a system for managing media communicated to a multiplexer in a media distribution network. The system includes an encoder for encoding media received from a Session Initiation Protocol (SIP) enabled media source into one or more media streams. The system also includes a SIP enabled multiplexer for multiplexing the one or more media streams. The SIP enabled multiplexer facilitates controlling the communication of the media received from the SIP enabled source. The media also includes a computing device having a data store associated with the SIP enabled multiplexer. The computing device facilitates the SIP enabled multiplexer controlling the media received from the SIP enabled source.

In another aspect, the present invention provides computer storage media having computer-executable instructions embodied thereon for performing a method for managing the communication of media communicated to a Session Initiation Protocol enabled multiplexer in a media distribution network. The method includes receiving information from a Session Initiation Protocol (SIP) enabled multiplexer. The information indicates a first level at which media is to be communicated to the media multiplexer. The method also includes receiving a request from a media source to communicate media from the media source at a second level. The method additionally includes communicating to the media source an indication that media is to be communicated at the first level. The method also includes receiving a second request from the media source to communicate media at the first level.

A third aspect of the present invention provides a method for managing the communication of media communicated to a Session Initiation Protocol enabled multiplexer in a media distribution network. The method includes receiving, at a Session Initiation Protocol (SIP) enabled multiplexer, information from a component of a media distribution network. The information indicates a status of the media distribution network. The method also includes storing the information in a data store associated with the SIP enabled multiplexer. The method also includes determining a level of communication at which media is to be communicated to the SIP enabled multiplexer. Additionally, the method includes communicating, from the SIP enabled multiplexer, a SIP message to a media source. The SIP message includes the level of communication. The method also includes receiving media communicated from the media source at the level of communication.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal digital assistant or other handheld device. Generally, program modules including routines, programs, objects, modules, data structures, and the like, refer to code that performs particular tasks or implements particular abstract data types. Embodiments may be practiced in a variety of system configurations, including handheld devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; carrier waves; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
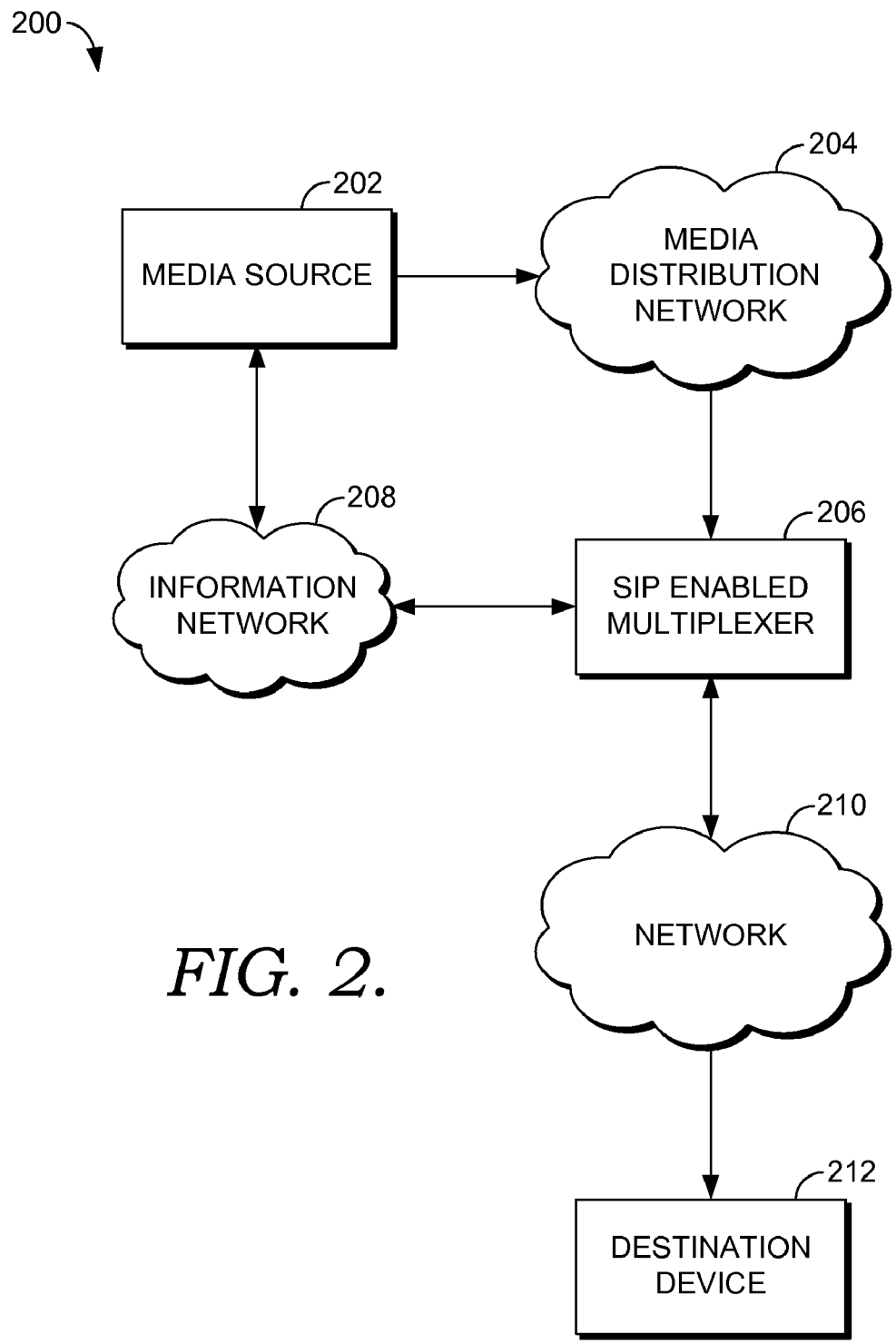
FIG. 2 depicts a block diagram illustrating an exemplary system suitable for implementing embodiments of the present invention.

With reference to FIG. 2, a block diagram is provided illustrating an exemplary system 200 in which embodiments of the present invention may be employed. It should be understood that this and other arrangements described herein are set forth only as examples. Other arrangements and elements (e.g., computing devices, machines, functions, and groupings of elements, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 includes a media source 202, a media distribution network 204, a Session Initiation Protocol (SIP) enabled multiplexer 206, an information network 208, a network 210, and a destination device 212. Each of the components shown in FIG. 2 may be any type of computing device, such as computing device 100 described with reference to FIG. 1, for example. The components may communicate with each other via one or more networks, which may include, without limitation, one or more local area networks (LANs) and/or wide area networks (WANs). Such networking environments are commonplace in offices, enterprise-wide computer networks, intranets, and the Internet. Additional networking environments include satellite communications networks, cable television networks, and wireless communication networks, such as television broadcasting, WiMax compatible networks, and other Internet Protocol (IP) based networks. It should be understood that any number of networks, media sources, SIP enabled multiplexers, encoders, decoders, destination devices, and servers may be employed within the system 200 while still being within the scope of the present invention. Additionally, other components not shown may also be included within the system 200, such as, but not limited to, computing devices, data stores, encoders, decoders, and communication components.

The media source 202 is a source for media that is to be received, at least in part, by a destination device. For example, a media source is a mobile communications device that is capable of communicating media. In one exemplary embodiment, a media source is a mobile communications device that is functional to capture audio, video, or both audio and video. A mobile communication device includes devices that are capable of communicating utilizing technologies compatible with the Third Generation Partnership Project (3GPP), the Third Generation Partnership Project 2 (3GPP2), IEEE 802.16 (i.e., Wireles sMAN), and IEEE 802.11 (i.e., WiFi). By way of example, 3GPP and 3GPP2 compatible technologies include Global System for Mobile Communication (GSM) and Code division Multiple Access (CDMA) methodologies. An exemplary mobile communication device is a mobile phone with an associated camera and microphone to capture audio and video.

An additional example of a mobile communications device includes a computing device that is associated with one or more media capture devices, such as a camera, microphone, listening device (i.e., doppler and sonar), and surveillance device (i.e., infrared detectors and surveillance systems). For example, a computing device with a camera and a microphone that includes a wireless card that allows the computing device to communicate over a wireless network (e.g., 3GPP, 3GPP2, IEEE 802.16, and IEEE 802.11). Expanding on this example, a television news crew that is reporting from a remote location may capture audio and video that is then communicated over a wireless network utilizing a computing device of the news crew. In addition to utilizing a wireless network, the computing device may also communicate the media by way of a wired network or some combination of wired and wireless networks.

Media, as used herein, is any combination of audible, visual (static and/or dynamic), and/or data elements that are communicated in a computing environment. For example, media includes audio and video that is encoded in a standard, such a Motion Picture Experts Group (MPEG) 1, MPEG 2, MPEG 3, MPEG 4, MPEG 7, and MPEG 21. Therefore, in the previous example, media is the data communicated from a media source. For example, a news crew with a camera and microphone capture a news clip that will be broadcast on the television news or an associated website that communicates the clip as media to a news station or a server that is accessible for retrieving the media. Media is not limited to the above examples, but instead, may also include data, objects, and other elements that are intended to convey information. For example, textual elements that are communicated are a media in an example.

The media distribution network 204 is a network utilized by the media source 202 to communicate media to the SIP enabled multiplexer 206. In an exemplary embodiment, as previously discussed, a media distribution network is a terrestrial based (not a satellite communication network) wireless network (e.g., 3GPP, 3GPP2, IEEE 802.16, and IEEE 802.11 compatible networks). In an additional exemplary embodiment, a media distribution network is a satellite communication network. For example, television networks can communicate media by way of a satellite network. In an exemplary embodiment, a television crew captures audio and video information that is communicated as media from a remote location. The media is communicated from the television crew to another facility of the television network (or other television network) by a satellite feed. In an additional embodiment, a media distribution network is an IP compatible network that is capable of communicating media utilizing any of a plurality of protocols (e.g., TCP/IP, ATM, and synchronous protocols).

A media distribution network may also include decoders, encoders, modulators, receivers, transceivers, transmitters, and data stores. In an exemplary embodiment, when a satellite network is utilized for communicating media, the media passes through a modulator before being communicated to a satellite that relays the media to one or more receivers. The media, in this example, is decoded at the receivers before being encoded at one or more encoders as a packet elementary stream (PES). The media is then manipulated by a multiplexer into a transport stream, which is then communicated to one or more end devices by way of another network, such as a media distribution network. This is but one exemplary embodiment of communicating media from a media source, such as the media source 202 to a destination device, such as the destination device 212.

The SIP enabled multiplexer 206 is a component that performs multiplexing on the media received from the media source 202. In general, a multiplexer allows for several objects, such a media, to share a common resource, such as a communication line or network bandwidth. An additional example of a multiplexer is a device that combines variable bit rate data streams into a constant bandwidth signal, such as by a packet mode communication. In yet an additional exemplary embodiment, a multiplexer is a combination of functionality associated with a multiplexer that takes multiple objects and merges those objects into a single resource, and a demultiplexer, which restores the multiple objects from the common resource.

Enabling a multiplexer with SIP functionality allows a signaling protocol to facilitate communication between a media source and the multiplexer to control resources utilized in the communication of media. SIP is a signaling protocol that is situated at the application layer of a TCP/IP model. SIP is independent of an underlying transport layer, which includes, but is not limited to, TCP (Transmission Control Protocol), UDP (User Datagram Protocol), SCTP (Stream Control Transmission Protocol), and RSVP (Resource Reservation Protocol).

A SIP enabled multiplexer, such as the SIP enabled multiplexer 206, is capable of communicating with one or more media source to control the utilization of resources. For example, if media is communicated from a media source at a rate that is consuming more resources than a media distribution network is able to handle, the SIP enabled multiplexer is aware of the loss in resources and is able to communicate with a media source that a lower consuming rate should be utilized to coincide with available resources. Continuing with this example, if a destination device is only receiving communicated media at a bit rate comparable to a multimedia compression of h.264, but the media source is requesting to communicate the media utilizing a multimedia compression of h.263 (which requires more resources than h.264), the SIP enabled multiplexer is able to signal with the media source by way of SIP to communicate the media at the lower bit rate utilized by h.264. Therefore, the resources utilized by the media source to communicate the media are commensurate with the resources available for delivering the media content. This allows for a savings in resources, such as bandwidth, from the media source until a point of restricted resources, such as a bandwidth bottleneck. In an exemplary embodiment, the SIP communications utilize SIP session description protocol for negotiating the resource utilized during the communication of media.

The SIP enabled multiplexer 206 communicates with the media source 202 by way of an information network 208. Similar to other networks previously discussed, the information network 208 includes wireless and/or wired networks. For example, an information network is a wireless telecommunication network (e.g., 3GPP, 3GPP2, IEEE 802.16, and IEEE 802.11 compatible networks). In an exemplary embodiment, the information network 208 is a network utilized by a mobile communications device. Continuing with this example, the mobile communications device, in this example, is a wireless phone that communicates on a 3GPP compatible network. In an exemplary embodiment, an information network is an IP Multimedia Subsystem (IMS) enabled information network that allows a SIP enabled mobile communication device to communicate information with a SIP enabled multiplexer.

It is understood, that while the information network 208 and the media distribution network 204 are illustrated as independent networks in the illustrative example of FIG. 2, the media distribution network 204 and the information network 208, in an additional embodiment, share one or more resources or are a common network. Therefore, while multiple networks are visually depicted, it is understood that a common network may be utilized for the communication of the media and additional information, such as SIP messages.

The network 210 is a network for distributing one or more transport streams from the SIP enabled multiplexer 206 to the destination device 212. As previously discussed with respect to other networks of FIG. 2, a network is contemplated as being a wired and/or wireless network. For example, the network 210, in an exemplary embodiment, is a network for distributing media to be displayed by a television. For example, a cable television network, a fiber optic network, a Direct Subscriber Line (DSL) network, and a satellite network. In an additional embodiment, the network 210 is referred to as an access network.

In an exemplary embodiment, the SIP enabled multiplexer receives information from one or more components of the media distribution network 204 and the network 210 as to the resources available for communicating media from the media source 202. For example if the bit rate available for communicating media through the network 210 is less than the bit rate at which the media source 202 requests to communicate media, the SIP enabled multiplexer 206 communicate with the media source 202 to communicate the media at a lower bit rate.

The destination device 212 is a device for facilitating the storing and/or presenting of media communicated from the media source 202. For example, a destination device includes a cable modem, a set-top box for receiving cable television information, a TCP/IP enabled modem, and other devices for receiving media. In an exemplary embodiment, a destination device is a set-top cable television box that includes a cable modem for receiving information related to received media. In yet a further exemplary embodiment, a destination device is SIP enabled to facilitate communication with one or more components of a network, a media distribution network, an information network, a SIP enabled multiplexer, and a media source.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting.

Figure 3:
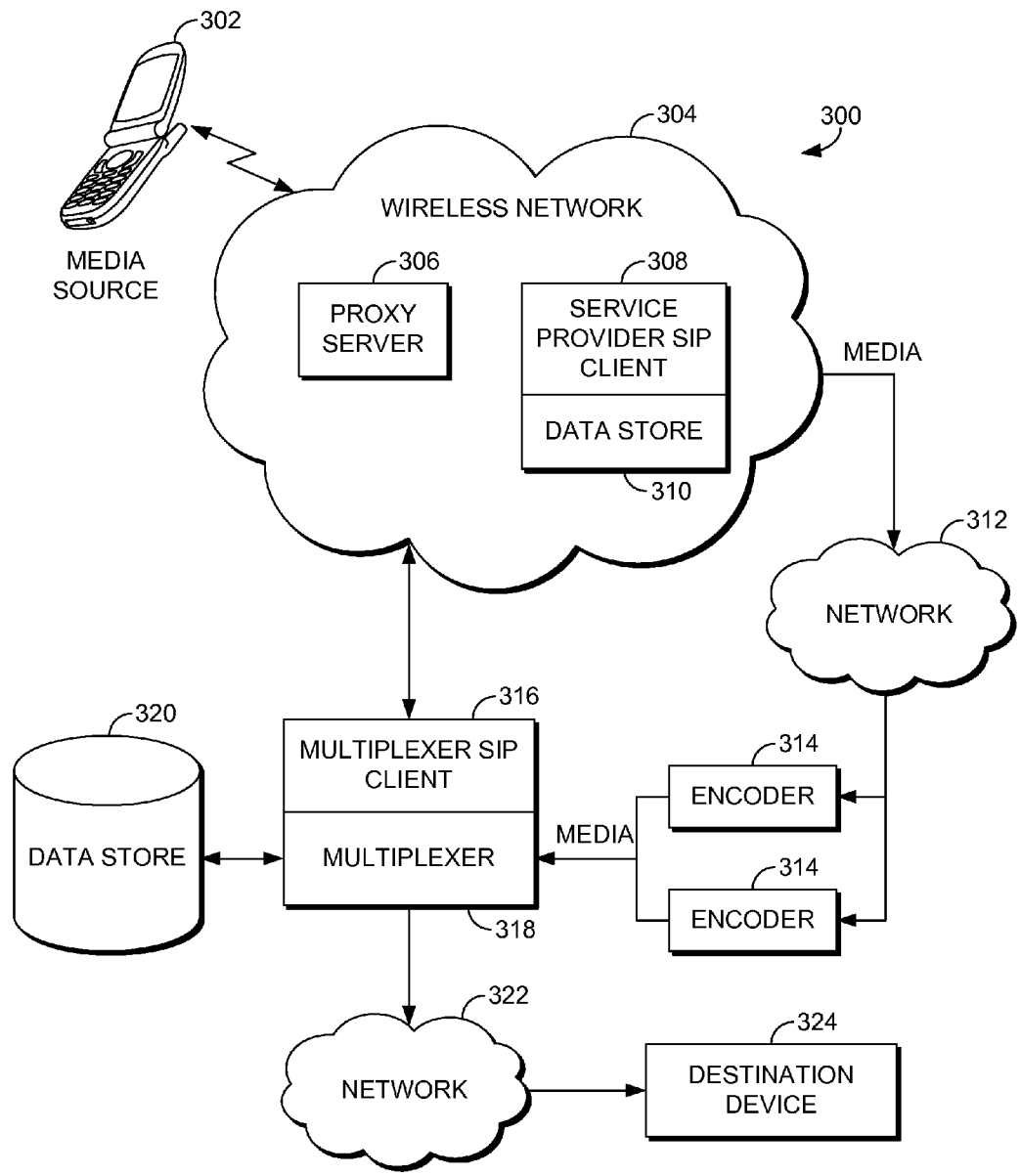
FIG. 3 depicts a block diagram illustrating an exemplary system utilizing a mobile communications device and a Session Initiation Protocol enabled multiplexer for communicating media that are suitable for implementing embodiments of the present invention.

With reference to FIG. 3, a block diagram is provided illustrating an exemplary system 300 suitable for implementing embodiments of the present invention. The system 300 includes, a media source 302, a wireless network 304, a proxy server 306, a service provider SIP client 308, a data store 310, a network 312, encoders 314, a multiplexer SIP client 316, a multiplexer 318, a data store 320, a network 322, and a destination device 324. In an exemplary embodiment, the system 300 is functional for communicating media from the media source 302 to the destination device 324 while reducing contention among the various components of system 300 with SIP messaging.

The media source 302, in this exemplary embodiment, is a mobile communications device. Similar to the media source 202 previously discussed with respect to FIG. 2, the media source 302 is a source of media to be communicated to one or more destination devices. In an exemplary embodiment, the media source is a mobile communication device that is functional to communicate media captured by the media source or an associated component. For example, a media source includes a smart phone with an integrated camera and microphone for capturing visual and audio elements. The smart phone is functional to communicate the captured audio and video elements through a wireless network utilizing a 3GPP/3GPP2 compatible technology. Further, in an additional embodiment, the media source is SIP enabled to negotiate a communication session utilizing SIP.

The wireless network 304 is a wireless telecommunications network that facilitates the communication of media from the media source 302. For example, a wireless telecommunications network is a network that is compatible with 3GPP, 3GPP2, IEEE 802.16, and IEEE 802.11 technologies. An exemplary wireless network includes a number of components not depicted in FIG. 3. For example, base station controllers, a node b, transceivers, towers, computing devices, servers, proxy servers, data stores, and switches are but a few additional components that may be included in a wireless network. In an exemplary embodiment, the wireless network 304 is operated, at least in part, by a wireless telecommunications service provider.

The wireless network includes a proxy server 306. The proxy server 306, in an exemplary embodiment, serves as a relay for information between the media source 302 and the service provider SIP client 308. For example, SIP messages communicated between a media source and a service provider SIP client are relayed through a proxy server in an exemplary embodiment.

The service provider SIP client 308 is a SIP client that facilitates functionality inherent to SIP within a wireless network. In an exemplary embodiment, the service provider SIP client functions as an intermediary between a media source and a multiplexer. For example, a SIP invite communicated from a media source to a service provider by way of a wireless network is received by a service provider SIP client to establish a communication.

In another exemplary embodiment, a media source, such as the media source 302, is a stateless device that does not maintain a state of the system. A service provider SIP client, in this example, is a stateful device that does maintain a state of the system. Therefore, when a media source communicates an invite to communicate media at a high bit rate, a service provider SIP client that receives the invite is able to respond to the media source with a suggested invite to lower the bit rate to a level that the media source desires to communicate media. In this example, the service provider SIP client is stateful and maintains a record of information as to the state of the system, such as information received from a SIP enabled multiplexer. The data store 308 is a data store that maintains information accessible by the service provider SIP client 308. For example, the data store 310, in an exemplary embodiment, includes data received from or derived from a SIP enabled multiplexer. Therefore, in an embodiment, a data store facilitates a service provider SIP client to be a stateful device. It is understood that a data store may include additional information other than that discussed. For example, the data store may also include accounting, accessibility, and administrative data that affects the ability of a media source to communicate media and/or data.

The network 312 is a network for communicating media originating from the media source 302. In an exemplary embodiment, the network 312 is a satellite network for communicating and/or delivering media from a wireless network to a media access entity, such as a television network provider. Therefore, in this exemplary embodiment, the media originating from the media source 302 is communicated by way of network 312. The communication of media by way of a network may include one or more modulators, encoders, and decoders.

The encoders 314 are media encoders for encoding media. In an exemplary embodiment of the present invention, encoders encode media originating from a media source into a digital format such as MPEG 2. For example, encoders encode media into one or more packetized elementary streams (PES) with a unique packet identifier (PID). The PID is utilized by a multiplexer when multiplexing multiple PES into a transport stream. A PID is also utilized later when demultiplexing a transport stream at a destination device. In an exemplary embodiment, the encoders 314 are SIP enabled. Further, it is understood that additional components of a media distribution network are SIP enabled to facilitate the communication of information, such as status information.

Once encoded, media is received by the multiplexer 318. In an exemplary embodiment, a multiplexer is operated by a service provider associated with a destination device. But, in an additional embodiment, a multiplexer is operated independent of a destination device. The multiplexer 318 aggregates one or more PES into a transport stream. Each PES and table is typically assigned a unique PID that is maintained with the PES or table once multiplexed. Therefore, a transport stream, in this example, includes one or more PES and associated PIDs, along with one or more tables and associated PIDs. A transport stream includes a concept of a program. A program is further described by a Program Map Table (PMT), which has a unique PID, and one or more PES associated with the program having their associated PIDs identified in the PMT. As discussed herein, a media stream includes transport streams, PES, and media communicated from a media source.

Multiplexing and demultiplexing of MPEG encoded media utilizes at least two program specific information tables, a Program Association Table (PAT) and a Program Map Table (PMT). A PAT is a listing of programs available in a particular transport stream. Each of the programs also includes a PID for an associated PMT. A PMT includes information about programs. For each program, there is typically one PMT. A PMT identifies one or more PIDs that contain data relevant to a particular program. A PMT also provides metadata about a PES.

To facilitate proper decoding of encoded media, MPEG and other encoding techniques, utilize a clock reference. For example, a Program Clock Reference (PCR) is included with a PID of a program to establish a master clock from which a Presentation Time Stamp (PTS) is relative. A clock reference ensures the proper encoding and decoding of digitally encoded media. In an exemplary embodiment, while various components of a media distribution network are aware of time references associated with packets of media, the time references are not material unless decoding or encoding the media.

The multiplexer SIP client 316 is a client that facilitates communication of SIP messages between one or more SIP enabled devices and the multiplexer 318. For example, one or more components of the network 312 and network 322 provide information as to the resources available or issues surrounding the communication of media. The information is utilized by the multiplexer 318 and the multiplexer SIP client 316 to communicate to the media source 302 a SIP message that indicates the state of the system with respect to communication of media. The combination of the multiplexer SIP client 316 and the multiplexer 318 results in a SIP enabled multiplexer.

The information identifying resources available or issues surrounding the communication of media includes program clock reference information, time stamp information, transport error rate, and synchronous byte information. In an exemplary embodiment, the data store 320 stores information received from the various components of networks 312 and 322. The data store 320 is functional to maintain the received information for use by the multiplexer 318 in making a determination as to a level of resources that the media source 302 should utilize for communicating media. For example, a transport error rate is a measurement of errors experienced as a result of transmission of the media. In an exemplary embodiment, if the transport error rate exceeds a predefined threshold, a media source supplying media is instructed to communicate the media at a lower bit rate that reduces the effects of a high transport error rate.

A determination to adjust the manner in which a media source is communicating media is made, in an embodiment, by a computing device. In an additional embodiment, the determination is made by a multiplexer. In yet an additional embodiment the determination is made by a service provider computing device, such as a computing device associated with a service provider SIP client. In yet another exemplary embodiment, the determination is made by a proxy server of the service provider. Further, the determination, in an exemplary embodiment, is made by a media source. It is contemplated that one or more components may be utilized for making a determination as to the manner in which a media source communicates media. In an exemplary embodiment, a determination to adjust the manner in which a media source is communicating media includes evaluating capabilities of components, such as the components of the media distribution network, media source, and destination device, user preferences, such as the media source user preference and end device user preference, and access technology. This allows for a negotiation of end-to-end delivery of media across one or more media distribution networks.

The network 322 is a network for distributing one or more transport streams resulting from the multiplexer 318. In an exemplary embodiment, the network 322 is a cable television network. Continuing with this example, the network 322 includes a digital network control system for identifying quams and frequencies that a particular program will be communicated within a cable system. Network 322 facilitates the communication of media to the destination device 324. For example, a destination device includes a set-top box for receiving digitally encoded media through a cable television network.

Figure 4:
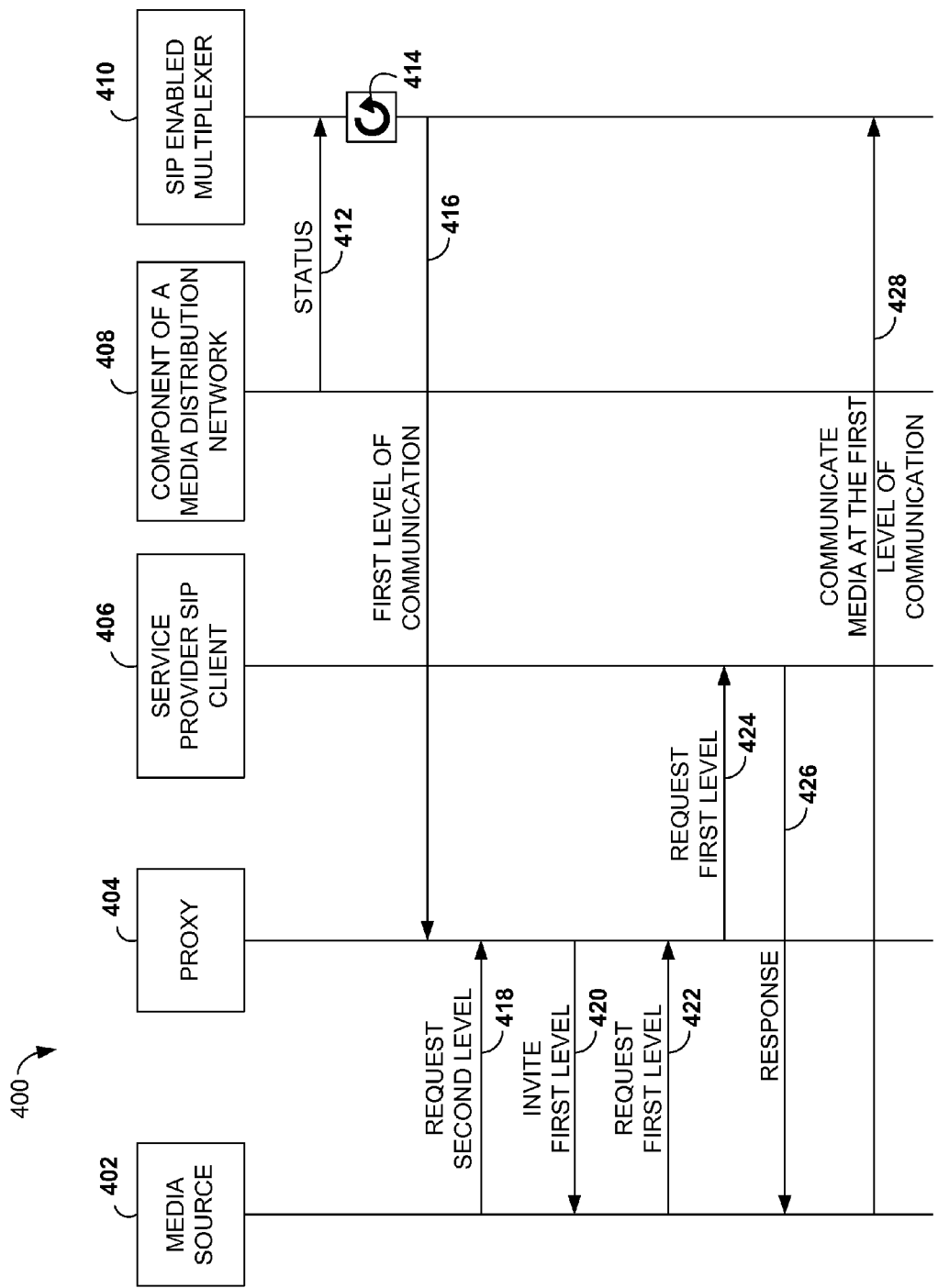
FIG. 4 depicts an exemplary data flow diagram illustrating an exemplary data flow, in accordance with an embodiment of the present invention.

With reference to FIG. 4, a data flow diagram is provided illustrating an exemplary data flow 400 suitable for implementing embodiments of the present invention. The data flow includes a media source 402, a proxy 404, a service provider SIP client 406, a component of a media distribution network 408, and a SIP enabled multiplexer 410. The media source 402 is a source of media. In an exemplary embodiment, the media source is similar in concept to the media source 202 discussed with respect to FIG. 2. The proxy 404 is a proxy for the media source 402, such as the proxy server 306 of FIG. 3. In an exemplary embodiment, the proxy server 404 acts as a stateful proxy maintaining information for use by the media source 402. The service provider SIP client 406 is a service provider SIP client that facilitates SIP functionality within a service provider network. In an exemplary embodiment, the service provider SIP client 406 is comparable to the service provider SIP client 308 of FIG. 3. The component of a media distribution network 408 is a component of one or more networks that is capable of reporting or determining a condition or status of the media distribution network. For example, a component of a media distribution network includes, but is not limited to, encoders, decoders, receivers, transmitters, transceivers, switches, computing devices, multiplexers, demultiplexers, head end units or components, digital network control systems, set-top boxes, cable modems, and status identifying devices. The component allows for the reporting, detecting, and relaying, of information that indicates a condition or status of a media distribution network, such as a wired or wireless network. The SIP enabled multiplexer 410 is a multiplexer that is functional to communicate with SIP messages with one or more components of a network.

The component of a media distribution network 408 communicates a status of the media distribution network. For example, a component, such as a decoder of the media distribution network 204 of FIG. 2, communicates with the SIP enabled multiplexer 410 information regarding the status of the media distribution network 204. Status information includes, but is not limited to, transport error rate, synchronization information, bit error rate, latency, and bandwidth constraints or expansions. In an additional exemplary embodiment, the component of a media distribution network is a component of the network 210 of FIG. 2. For example, a head end unit of the network 210 communicates status information to the SIP enabled multiplexer 410 regarding the status of the network 210 of FIG. 2. The frequency of the status communication in an exemplary embodiment is provided at a regular interval. In an additional embodiment, the frequency is determined based on one or more predetermined thresholds relating to the information being communicated. For example, a predefined threshold may include that a transport error rate greater than 10% requires status updates to be communicated at a more frequent interval than when a transport error rate is below 10%.

The component of a media distribution network 408 communicates information as to a status of the media distribution network to the SIP enabled multiplexer 410 at a step 412. The SIP enabled multiplexer determines a first level of communication that the media source 402 is to communicate the media at a step 414. For example, a bit rate or compression ratio or modulation type may be determined by the SIP enabled multiplexer 410 to reduce contention within the media distribution network. Continuing with this example, if a limited amount of bandwidth is available in the media distribution network and multiple media sources are attempting to provide media that, in the aggregate, exceeds the resources available, the contention is reduced by restricting or throttling the communication from the media sources by using lower bit rates or higher compression. In an additional example, if excess resources exist in the media distribution network, the SIP enabled multiplexer 410 determines that a greater bit rate or lower compression is acceptable to increase the quality of the media being communicated.

While the determination, at step 414, to communicate at a first level is indicated at the SIP enabled multiplexer 410 for this exemplary embodiment, it is understood that the determination as to a level of communication is contemplated to be determined at one or more alternative components or devices. For example, the determination, in an exemplary embodiment, is made by the service provider SIP client 406. In an additional exemplary embodiment, the determination is made by the proxy 404. In yet another exemplary embodiment the determination is made by the media source 402.

After determining the first level of communication, the SIP enabled multiplexer 410 communicates an indication as to the first level of communication to the proxy 404. In an exemplary embodiment, the proxy 404 stores, in a data store, the indication as to the first level of communication. In yet an additional exemplary embodiment, the proxy 404 maintains the first level of communication until an invite is received from the media source 402 to communicate media. In an exemplary embodiment, the media source 402 communicates a request to communicate media when a user of the media source 402 commands the media source to communicate media. For example, a user of a mobile communications device, such as a camera-enabled phone, captures, in real-time, video of a breaking event that the user desires to communicate to a news station for inclusion in a program. The user, in this example, connects with the news station, which entails a request being communicated by the phone to establish a media sharing session over a wireless network.

In an exemplary embodiment, the media source 402 includes a set of default characteristics that the media source reverts to when requesting to communicate media. These defaults, in one example are based on user indicated settings, such as compression and bit rate settings. In an additional example, the default settings are established by a service provider or manufacturer of the media source 402. A media source that is instructed to communicate media communicates a request to the proxy 404 to communicate media at second level, as shown at a step 418. The second level, in this example, is a level that requires a greater quantity of resources than the first level of communication previously discussed at the step 416. Upon receiving a request to communicate media at the second level, the proxy 404 communicates, at a step 420, a SIP invite to the media source 402 to communicate the media at the first level. The media source 402 receives the invite of step 420 and communicates a request to communicate the media at the first level, as shown at a step 422. The proxy 404 relays the request to communicate media at the first level to the service provider SIP client 406 at a step 424. The service provider SIP client 406 establishes a communication tunnel and/or communications session for communicating the media. As a result, the service provider SIP client 406 communicates a response at a step 426. The response acknowledges the request for communicating the media at a first level. The media source 402 communicates the media at the first level of communication, which is received by the SIP enabled multiplexer 410, as shown at a step 428.

Figure 5:
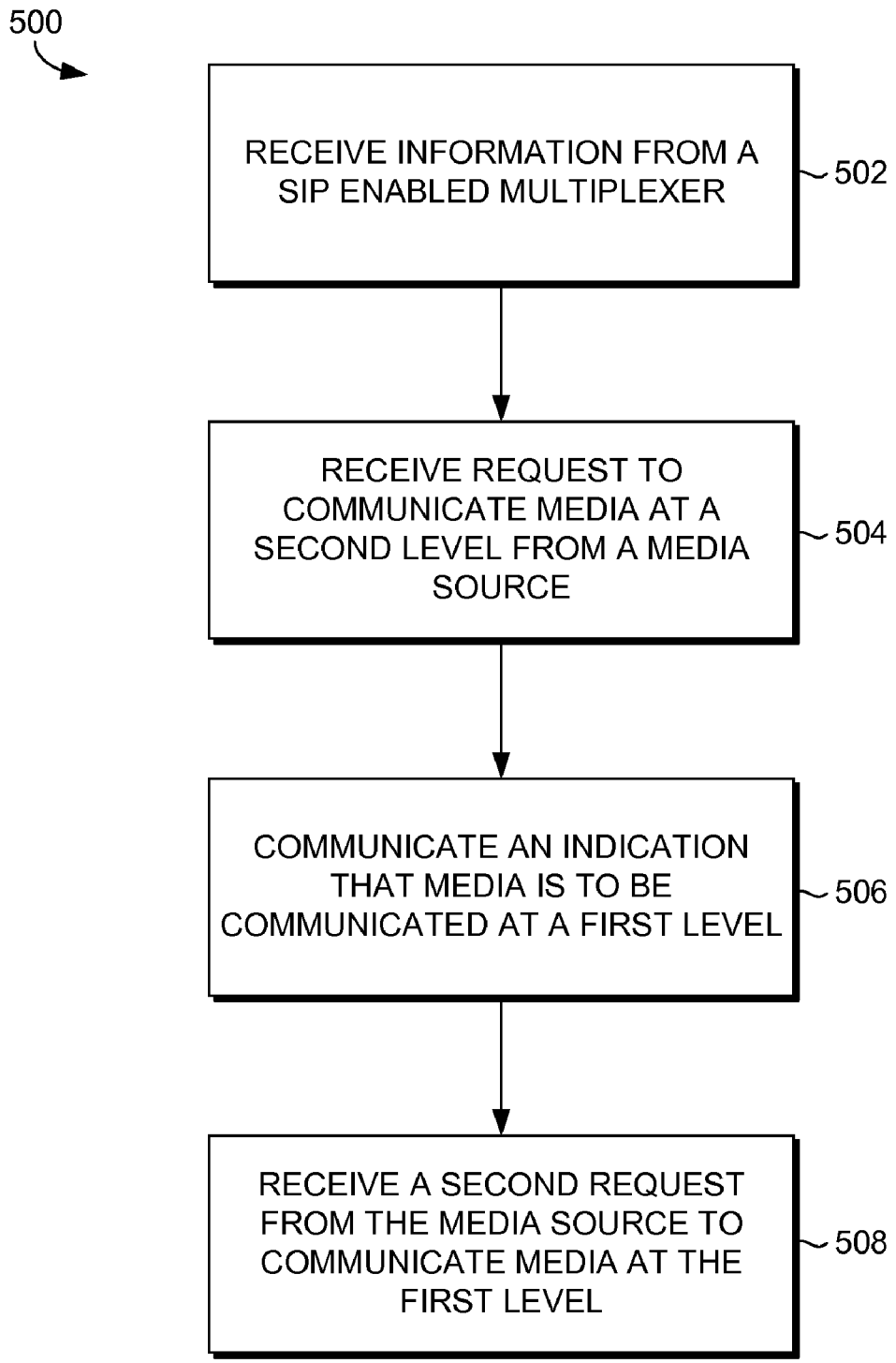
FIG. 5 depicts a method for managing the communication of media communicated to a Session Initiation Protocol enabled multiplexer in a media distribution network in accordance with an embodiment of the present invention.

Turning to FIG. 5, a flow diagram is provided illustrating a method 500 for managing the communication of media communicated to a Session Initiation Protocol enabled multiplexer in a media distribution network in accordance with an embodiment of the present invention. As shown at a block 502, information is received from a SIP enabled multiplexer. In an exemplary embodiment of the present invention, a proxy server for a media source receives the information from the SIP enabled multiplexer. The proxy server, in this example, stores the information in anticipation of a media source requesting to communicate media. In an additional embodiment, the information is received by a media source. In yet another embodiment, the information is received by a SIP client of a service provider in which a media source operates.

The information received at the block 502 includes information that allows for a determination as to a level at which media is to be communicated to the SIP enabled multiplexer. The information, in an exemplary embodiment, includes status indicators or additional metrics that facilitate making a determination as to the level at which the media to be communicated.

The information received at the block 502, in an exemplary embodiment, indicates a first level of communication at which media is to be communicated to the SIP enabled multiplexer. The first level of communication is determined, at least in part, based on the resources available within one or more networks utilized for communicating and distributing the media. Additionally, the first level of communication, in an exemplary embodiment, is determined utilizing one or more status indications provided by components of the networks utilized in the communication and distribution of the media. For example, a transport error rate is a status indication that, in an embodiment, is provided to the SIP enabled multiplexer for use in determining the first level of communication.

The first level of communication, as previously discussed, is an indicator of an acceptable compression ratio at which the media is to be communicated, a transfer rate at which the media is to be communicated, or a particular communications standard that should be utilized when communicating the media to the SIP enabled multiplexer. For example, the first level of communication may be an indication that the media is to be transferred in accordance with an h.264 standard. Continuing with this example, the h.264 standard is selected to reduce the contention within one or more networks communicating and distributing the media.

At a block 504, a request is received to communicate media at a second level from a media source. In an exemplary embodiment, a proxy server of the media source receives a request from the media source to communicate media at the second level. In yet another embodiment, a service provider SIP client receives the request to communicate media at the second level from a media source.

At a block 506, an indication that the media is to be communicated at a first level is communicated to the media source. For example, a proxy server that received an indication, or determined that the media is to be communicated at a first level, communicates to the media source that the media is to be communicated at the first level of communication. At a block 508, a second request is received from the media source to communicate media at the first level. In an exemplary embodiment, the first level of communication results in less media per unit of time than communicating at the second level. For example, the bit rate of the first level is lower than the bit rate of the second level. As a result, the entire media is communicated, but the amount of information communicated to represent the media is less with the first level of communication.

For example, a SIP enabled multiplexer receives information that indicates contention within a media distribution network as a result of more resources being requested than are available for communicating media. As a result, the SIP enabled multiplexer determines that media is to be communicated at a level that requires fewer resources. The SIP enabled multiplexer communicates this level of communication to a proxy server that serves a media source. The proxy server, in this example, maintains the indication of level of communication to be utilized until a request is received from a media source. The media source communicates a request. The proxy server examines and inspects the request received from the media source to identify the level of communication contained within the request. In an exemplary embodiment, if the level of communicating in the request is similar or utilizes fewer resources, that request is relayed on to the intended recipient. But, if the request includes a level of communication that exceeds the level of communication indicated by the SIP enabled multiplexer, a message is provided to the media source indicating the level of communication identified by the SIP enabled multiplexer. The media source then amends the request to conform to the level of communication indicated by the SIP enabled multiplexer. The proxy server once again inspects the request to ensure conformance with the suggested level of communication. The proxy server forwards conforming requests on to the intended recipient of the request.

Figure 6:
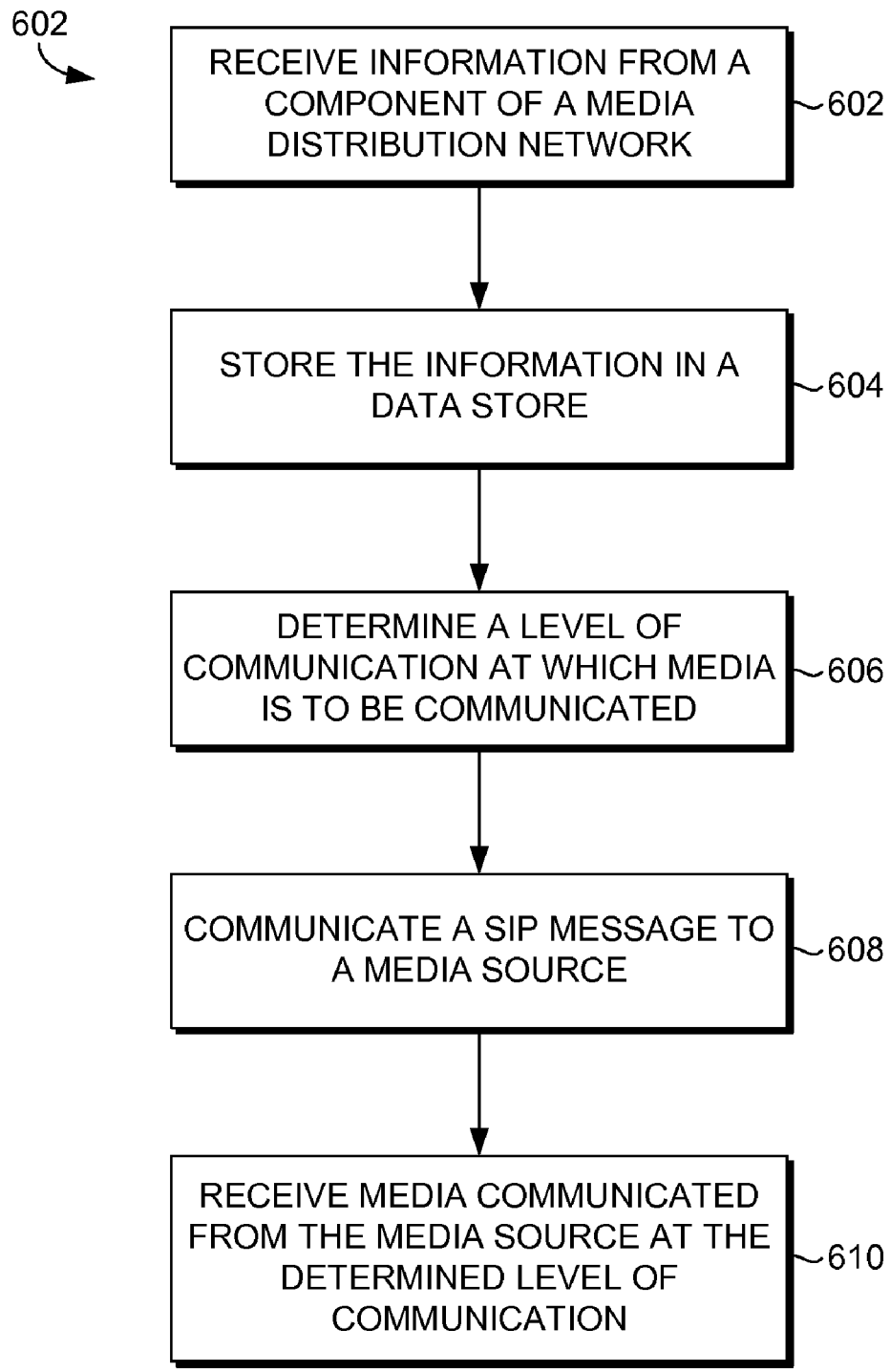
FIG. 6 depicts an additional method for managing the communication of media communicated to a Session Initiation Protocol enabled multiplexer in a media distribution network in accordance with an embodiment of the present invention.

Turning to FIG. 6, a flow diagram is provided illustrating a method 600 for managing the communication of media communicated to a Session Initiation Protocol enabled multiplexer in a media distribution network in accordance with an embodiment of the present invention. As shown at a block 602, information is received from a component of a media distribution network. In an exemplary embodiment, a SIP enabled multiplexer receives a status indication from a component of a network communicating or distributing media. The status indication facilitates a determination as to the contention within the network. Additionally, the status indication allows for measuring the resource levels available for communicating media.

At a block 604, the information received from a component of the media distribution network is stored in a data store. In an exemplary embodiment, the data store is associated with a SIP enabled multiplexer. The data store allows the information to be analyzed, retrieved, and communicated for later utilization. At a block 606, a level of communication at which media is to be communicated is determined. In an exemplary embodiment, the SIP enabled multiplexer utilizes the information stored in the associated data store to determine the level of communication. In an additional embodiment, the level of communication is determined at a computing device of a service provider associated with a media source. For example, a proxy server or a service provider SIP client, in an embodiment, utilizes the information stored in the data store to make a determination as to a level of communication at which media is to be communicated.

At a block 608, a SIP message is communicated to a media source. The SIP message includes an indication as to the level of communication at which the media source is to communicate media. In an exemplary embodiment, a SIP enabled multiplexer communicates the SIP message to a service provider. The service provider relays the message to one or more proxy servers that act as stateful devices for one or more stateless media sources. In an additional embodiment, a SIP enabled multiplexer communicates the SIP message to a media source, but the SIP message is intercepted by a proxy of the media source. The proxy maintains the information of the SIP message in anticipation of a request from the media source. In an additional exemplary embodiment, the SIP message includes an indication to a level of communication at which a media source is to communicate media to reduce contention.

At a step 610, media communicated from a media source at the determined level of communication is received. In an exemplary embodiment, the media source is a mobile communications device that communicates the media by way of a telecommunications network. In an additional exemplary embodiment, the media is received by a SIP enabled multiplexer.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for managing media communicated to a multiplexer in a media distribution network, the system comprising:
    an encoder for encoding media received from a Session Initiation Protocol (SIP) enabled media source into one or more media streams;
    a SIP enabled multiplexer for multiplexing the one or more media streams, wherein when a request is received from the SIP enabled media source to transmit the media at a level of communication requiring a level of resources greater than an available amount of resources in the media distribution network, the SIP enabled multiplexer facilitates controlling the level of communication at which the media is received from the SIP enabled media source to be commensurate with the available amount of resources in the media distribution network; and
    a computing device having a data store associated with the SIP enabled multiplexer, wherein the computing device facilitates the SIP enabled multiplexer controlling the media received from the SIP enabled media source.

2. The system of claim 1, wherein the encoder encodes media in an Internet Protocol (IP) stream.

3. The system of claim 1, wherein the media includes audible and visual elements.

4. The system of claim 1, wherein the SIP enabled media source communicates, in part, by way of a wireless telecommunications network.

5. The system of claim 1, wherein the one or more media streams include real-time content.

6. The system of claim 1, wherein the one or more media streams are communicated, in part, from the SIP enabled media source to the SIP enabled multiplexer by way of at least one selection from the following:
    a satellite communications network;
    an Internet Protocol based network; and
    a wireless communications network.

7. The system of claim 1, wherein controlling the communication of media received from the SIP enabled media source includes an adjustment of a compression rate utilized by the SIP enabled media source.

8. The system of claim 1, wherein controlling the communication of media received from the SIP enabled media source utilizes a SIP enabled proxy associated with the SIP enabled media source.

9. The system of claim 1, wherein the data store is functional to store at least one from the following:
    program clock reference information;
    STC information;
    time stamp information;
    transport error rate; and
    synchronous bytes.

10. One or more computer storage media having computer-executable instructions embodied thereon for performing a method for managing the communication of media communicated to a Session Initiation Protocol enabled multiplexer in a media distribution network, the method comprising:
    receiving information from a Session Initiation Protocol (SIP) enabled multiplexer, wherein the information indicates a first level at which media is to be communicated to the SIP-enabled multiplexer, wherein the first level corresponds to an available amount of resources;
    receiving a request from a media source to communicate media from the media source at a second level, wherein the second level requires an amount of resources that is different than the available amount of resources;
    communicating to the media source an indication that media is to be communicated at the first level; and
    receiving a second request from the media source to communicate media at the first level.

11. The media of claim 10, wherein the SIP enabled multiplexer communicates the information to communicate at the first level as a result of a transport error rate exceeding a predefined threshold.

12. The media of claim 10 further comprising determining the first level from the information.

13. The media of claim 10, wherein the first level is at least one from the following:
    a compression ratio;
    a transfer rate; or
    a communication standard.

14. The media of claim 10, wherein the first level is at an H.264 standard and the second level is at an H.263 standard.

15. The media of claim 10, wherein communicating at the first level communicates less media per unit of time than communicating at the second level.

16. A method for managing the communication of media communicated to a Session Initiation Protocol enabled multiplexer in a media distribution network, the method comprising:
    receiving, at a Session Initiation Protocol (SIP) enabled multiplexer, information from a component of a media distribution network, wherein the information indicates a status of the media distribution network;
    storing the information in a data store associated with the SIP enabled multiplexer;
    determining a first level of communication at which media is to be communicated to the SIP enabled multiplexer;
    determining that receiving media from a media source at a second level of communication would require a greater quantity of resources of the media distribution network than receiving media at the first level of communication;

communicating, from the SIP enabled multiplexer, a SIP message to the media source, wherein the SIP message includes an indication to communicate media at the first level of communication; and receiving media communicated from the media source at the first level of communication.

17. The method of claim 16, wherein the component is an encoder.

18. The method of claim 16, wherein the media distribution network is at least one selection from the following:

a cable television network;

a Direct Subscriber Line network; or an Internet Protocol network.

19. The method of claim 16, wherein the determination of the first level of communication at which media is to be communicated is based, in part, on the received information.

20. The method of claim 16 further comprising:

receiving a second set of information from the component of the media distribution network, wherein the second set of information is received as a result of a change in the status of the media distribution network;

storing the second set of information; and determining a third level at which media is to be communicated to the SIP enabled multiplexer.

* * * * *